Oct. 2, 1962

F. F. TIMPNER ET AL 3,056,312

DYNAMIC VIBRATION ABSORBER

Filed Sept. 19, 1957

INVENTORS
Fred F. Timpner
Hulki Aldikacti
BY W. C. Middleton
ATTORNEY

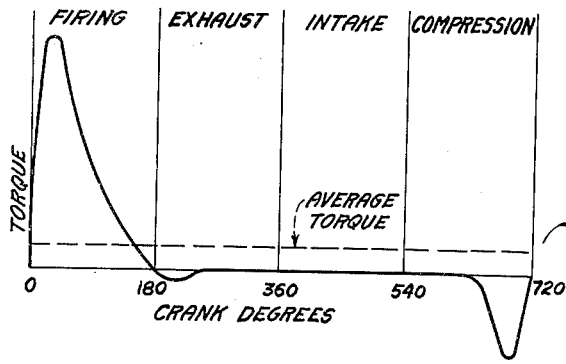
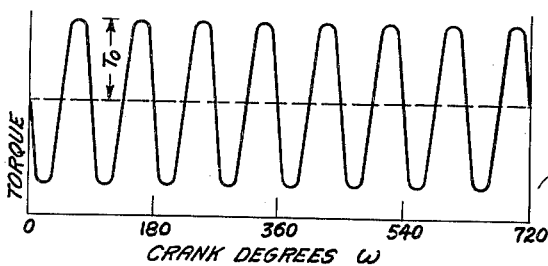
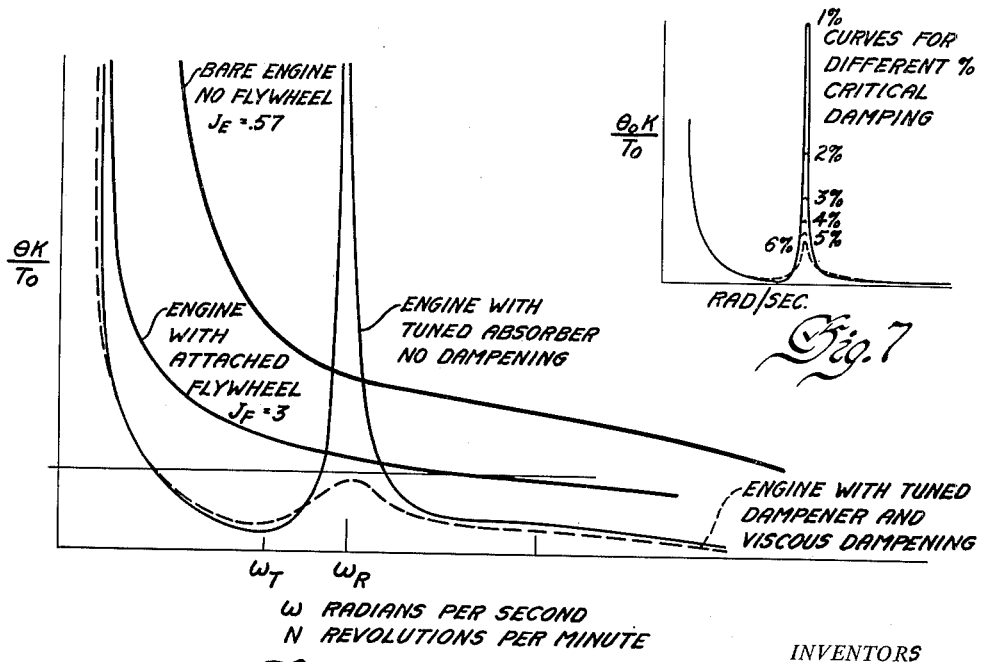

United States Patent Office

3,056,312
Patented Oct. 2, 1962

3,056,312
DYNAMIC VIBRATION ABSORBER
Fred F. Timpner, Birmingham, and Hulki Aldikacti, Pontiac, Mich., assignors to General Motors Corporation, Detroit, Mich., a corporation of Delaware
Filed Sept. 19, 1957, Ser. No. 684,892
5 Claims. (Cl. 74—574)

This invention relates to engine vibration dampeners and more particularly to motor vehicle engine vibration elimination.

There are two main classes of vibrations associated with reciprocating multicylinder engines. Both classes are vibrations caused by periodic accelerations of moving parts in the engine and by periodic variations in gas pressure on the pistons during operation. The first class of vibration is the type of vibrations transmitted to the frame or foundation by the engine as a whole while the second class includes torsional vibrations due to oscillations in the crankshaft and transmitted to drive train elements. This second class of vibrations can further be broken down into two types, namely (1) torsional vibrations of the crankshaft as a whole, that is the shaft acting as a solid rigid unit, and (2) torsional vibrations within the crankshaft wherein the crankshaft is twisting within itself. The first type of torsional vibration generally occurs only at low engine speeds wherein the shaft is relatively stiff and is caused by the intermittent firing in the various cylinders causing a varying pressure on the pistons and hence varying torque on the crankshaft. With the crankshaft acting as a rigid unit there is no natural or resonant frequency of the shaft. Since the shaft is not flexibly connected to any other element it therefore is not part of a resonant system. These vibrations are conventionally minimized by decreasing the response to the vibrations as by increasing the inertia of the system for example, by adding a heavy flywheel to the crankshaft. This amounts to merely making the system have a smaller degree of vibration from a given oscillating disturbing force. This type of torsional vibration is also minimized by having a relatively fast engine idle speed, i.e. never let the engine operate at a low speed when the amplitude of oscillation is great.

The second type of torsional vibration occurs when the engine is operating at higher speeds and the crankshaft has ceased to act as a rigid unit but acts as a resonant system having a group of independent spring connected units. At high speeds the portion of the crankshaft between each crank acts as a separate shaft, the whole shaft having a series of natural frequencies. In the case of a V-eight cylinder engine without a flywheel there are four natural frequencies each having a different node or nodes along the crankshaft. The addition of a flywheel adds a fifth natural frequency that is considerably lower than the others. In practice, engines are rarely operated at speeds above the first or flywheel created natural frequencies. Methods used to combat these high speed vibrations usually involve the use of some torsional vibration balancer tuned to these high frequencies and attached to the crankshaft.

It is with respect to the first low speed type of torsional vibration that this invention mainly relates, however as will be seen below the invention indirectly relates to the second type also.

The use of inertia flywheels to reduce the response of the crankshaft to the first type of torsional vibration has several disadvantages. In addition to increasing the weight of the power plant, and in the case of a motor vehicle the weight of the vehicle itself, the flywheel acts to decrease the acceleration of the engine. Furthermore, it acts to lower natural frequencies of torsional vibrations of the second high speed type to a point wherein they must be compensated. The inertia flywheel necessary for a high output engine generally is large and requires a considerable amount of space. Due to the space, weight and acceleration limitations, present engines, especially in motor vehicles, have fairly high idle speeds due to the flywheel effect being limited.

One method of reducing forced torsional vibrations is to provide a dynamic vibration absorber that is tuned to the frequencies at which the vibration occur. Unlike the flywheel effect which only makes the inertia of the system so large that the system is not affected too much by the oscillating forced vibrations, the dynamic vibration absorber actually produces oscillations of its own that act to cancel out some or most of the forced vibration. In other words, the system is not conscious of the external forced vibrations.

It is therefore an object of this invention to provide a dynamic torsional vibration absorber for a non-resonant system having forced vibrations imposed thereon.

It is a further object of the invention to provide a power plant installation in which no heavy flywheel is necessary to decrease the low speed vibration of the engine and in which the elimination of the flywheel also renders high speed crankshaft vibration absorbing devices unnecessary.

Another object of the invention is to provide a motor vehicle with an engine connected through a relatively flexible drive shaft to a relatively small viscous dampened rotating mass in order to eliminate low speed torsional vibration.

It is still a further object of the invention to provide a dynamic vibration absorber for a motor vehicle engine in which the propeller shaft and a torque converter or fluid coupling impeller attached thereto, act as a vibration absorber for low speed engine vibrations.

These and other objects, features and advantages will be apparent from the following specification and claims taken in conjunction with the accompanying drawings, in which:

FIG. 5 is a chart showing the torque curve of a single cylinder;

FIG. 6 is a chart showing the torque curve of an eight cylinder engine;

FIG. 7 is a chart showing the amplitude of vibration of a viscous dampened absorber at different percentages of dampening.

FIG. 8 is a chart comparing the amplitude of vibratin at various speeds for conventional systems and those incorporating the invention.

An explanation of the theory involved in the invention will aid in understanding the same and its application to particular installations. Referring to FIG. 5 which shows the torque curve of a single cylinder of a four cycle engine, it will be seen that there is a positive torque produced on the piston once every two revolutions of the crankshaft. During the exhaust and intake strokes there is no torque on the piston and during the compression stroke a small negative torque. The dotted line indicates the average torque for the two revolutions.

Figure 3:
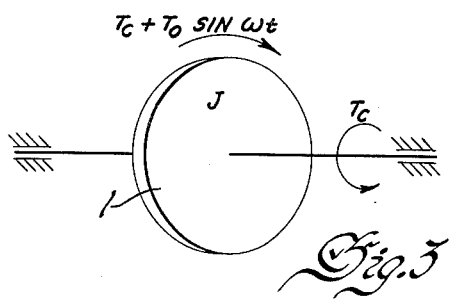
FIG. 3 is a diagrammatic view of an inertia system equivalent to an engine crankshaft at low speed operation.

FIG. 6 shows the combined torque of an eight cylinder engine. From the figure it can be seen that there are four cycles of torque oscillation during each 360° or one revolution of the crankshaft. Again the dotted line indicates the average torque impressed on the crankshaft. This average torque is also equal to the load on the engine, assuming a constant engine speed. At low speeds the crankshaft and associated inertias act as a rigid non-resonant unit and can be represented schematically by a single rotating disc with a constant drag or load torque and a driving excitation composed of a constant torque and a sinusoidally varying torque. This is shown in FIG. 3 in which $T_c$ indicates both the constant average torque impressed on the crankshaft, etc. by the combustion in the various cylinders and the equal and opposing constant torque due to the load on the engine. The sinusoidally varying exciting torque is $T_o \sin \omega t$ where $T_o$ is the maximum oscillation of the torque and J is the equivalent inertia of the crankshaft system. The two constant torques $T_c$ being equal and opposite, results in their cancellation of each other and the system can therefore be studied with only the oscillating torque $T_o \sin \omega t$.

The system in FIG. 3 can be described by: $T_o \sin \omega t = J\ddot{\theta}$ where:

$T_o$ is the maximum torque oscillation from the average torque in inch pounds, $T_o \sin \omega t$ is the oscillating torque at any instant, J is the equivalent moment of inertia of the crankshaft, and $\ddot{\theta}$ is the angular acceleration of the equivalent crankshaft.

$$\left\{\frac{d^2\theta}{dt^2}\right\}$$

By successive integrations of this equation the instantaneous equation $$\theta = -\frac{T_o}{J\omega^2} \sin \omega t \text{ can be obtained}$$

$\theta$ represents the angular oscillation of the crankshaft (considering it as a rigid element) in response to the alternating torque. In an eight cylinder engine the maximum oscillation $\theta$ occurs every 90° or four times for each crankshaft revolution, and at 90° $\sin \omega t = 1$ and therefore $$\theta \max = \frac{T_o}{J\omega^2}$$

Since $\omega$ is the frequency of the torque impulses, increasing the speed of the engine increases $\omega$ and thereby decreases $\theta$ max as the square of the speed. This is borne out in practice as observation indicates an engine will idle smoother at higher idle speeds. The present motor vehicles are set to idle at a speed high enough to render $\theta$ max tolerable.

By increasing the mass or effective radius of the crankshaft system as by attaching a heavy flywheel to the crankshaft the J term will be larger making $\theta$ max smaller for a given $\omega$ and $T_o$. This is also brought out in practice wherein increasing the size of the flywheel results in smoother idle operation at the same speed, or gives the same smoothness (amplitude of vibration represented by degree of oscillation $\theta$) at a lower speed.

If the torque impulses are not the same for all cylinders due to poor feed distribution, irregular firing, etc., then the oscillating torque will not be a sinusoidal wave at four times the engine speed or frequency but will have harmonics at ½, 1, 1½, 2, 2½, 3 and 3½ times engine frequency. This will make $\omega$ correspondingly smaller and $\theta$ max much larger. This is also verified in practice where misfiring of a single cylinder can cause rough operation of the engine at idle.

From the above it can be seen that a single disc under a sinusoidally varying torque is a good model or equivalent for an idling engine. A flywheel acts to increase the inertia of the system and thus to decrease the response of the system. Since it would appear from the above that to improve idle it is only necessary to decrease the response (amplitude of vibration or degree of oscillation) of the system then an engine should be able to idle smoothly without a flywheel if a tuned dynamic absorber were substituted for the flywheel. Such a system is shown in FIG. 4.

Figure 4:
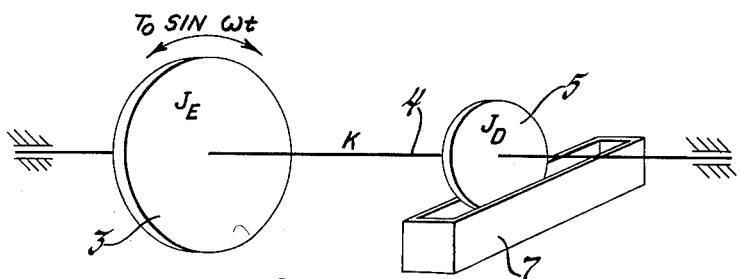
FIG. 4 is a diagrammatic view of an inertia system equivalent to an engine utilizing the invention.

In the system shown in FIG. 4 there is a disc 3 with an inertia $J_E$ equal to that of the crankshaft and associated parts, a disc 5 indicating a small damper mass having an inertia $J_D$ and 4 representing a relatively flexible shaft connecting the two discs and having a torsional spring rate K measured in radians/in. lb. As in the case of the FIG. 3 system the oscillating or disturbing force acting on the engine at idle speeds is $T_o \sin \omega t$. The element 7 indicates a means for providing viscous damping on oscillations of the damper mass 5. The term viscous damping is used here to indicate an external force that resists oscillation of a mass and where the degree of resistance is approximately proportional to the velocity of oscillation. Thus a friction dampener will resist oscillation with a constant force regardless of the speed, but a viscous dampener such as a dash pot or element in a hydrodynamic torque transmitting device will increase the resistance force with increase in oscillation velocity or frequency of oscillation. This system shown in FIG. 4 can be described by two general differential equations:

$$J_E\ddot{\theta}_E + K(\theta_E - \theta_D) = T_o \sin \omega t$$

or $$J_D\ddot{\theta}_D + C\dot{\theta}_D - K(\theta_E - \theta_D) = 0$$

where:

$J_E$ = inertia of engine (in.-lb.-sec.$^2$)
$\theta_E$ = angular oscillation of engine (radians)
$J_D$ = inertia of damper (in.-lb.-sec.$^2$)
$\theta_D$ = angular oscillation of damper (radians)
C = coefficient of viscous dampening (in. lb./rad.)
K = torsional spring rate (in. lb./rad.)

In a particular system using a crankshaft having a given inertia $J_E$, a damper mass having a given inertia $J_D$, a connecting shaft having a spring constant K and viscous dampening on the damper mass of C, a family of vibration curves can be plotted as seen in FIG. 7. The ordinate represents a dimensionless term $$\frac{\theta \cdot K}{T_o}$$

where the ratio $K/T_o$ is a constant for a given system and therefore the ordinate changes with $\theta$ and hence represents the amplitude or relative degree of vibration. The abscissa represents $\omega$ or frequency of the system. It will be noted that the amplitude of vibration is high at low speeds or frequency, drops to a low value at the tuned frequency and raises to a high value at the resonant frequency and thereafter drops off rapidly. The tuned or natural frequency of the damper mass and shaft system is dependent solely on the inertia of the damper mass and the spring rate of the connecting shaft and according to "Vibration Problems in Engineering" by S. Timoshenko (D. Van Nostrand Co., 3rd edition, 1955, page 10) can be represented by $$F_N = \frac{1}{2\pi}\sqrt{\frac{K}{J_D}}$$

where $F_N$ is in cycles per second or by $$\omega_N = \sqrt{\frac{K}{J_D}}$$

where $\omega_N$ is in radians per second. The resonant frequency of the complete system including the crankshaft, damper mass, and connecting shaft is dependent on the relative inertias of the crankshaft and damper mass, as well as the spring constant, and according to "Mechanical Vibrations" by Den Hartog (McGraw-Hill, 4th edition, 1956, page 430, can be represented by $$\omega_R = \sqrt{\frac{K(J_E + J_D)}{J_E J_D}}$$

where $\omega_R$ is in radians per second. This can also be expressed as $$F_R = \frac{1}{2\pi}\sqrt{\frac{K(J_E+J_D)}{J_E J_D}}$$

where $F_R$ is in cycles per second. The relation between the tuned frequency $\omega_T$ which is the natural frequency $\omega_N$ of the vibration absorber itself and the resonant frequency $\omega_R$ of the complete system including the engine and vibration absorber is determined by the equation $$\omega_R = \omega_T \sqrt{1 + \frac{J_D}{J_E}}$$

This last equation can be easily derived from the preceding equations.

By increasing the amount of viscous dampening the amplitude of vibration at resonance $\omega_R$ can be lowered. The particular value of viscous dampening employed can most easily be referred to as the percent of critical dampening, $$P = \frac{C}{2\sqrt{KJ_D}}$$

where P is the actual dampening in percentage of the minimum dampening necessary to completely dampen out the resonant vibration.

It will be noted from FIG. 7 that a relatively small percent of dampening has a great effect on the vibration amplitude and that it is not necessary to have complete dampening to keep the resonant amplitude fairly low.

In FIG. 8 there are represented four different crankshaft systems. The curves are plotted the same way as those in FIG. 7 and are determined from the general equations given above. The highest curve is that of an engine crankshaft without a flywheel or equivalent. Note that the amplitude of vibration remains fairly high even at high frequencies. The next lower curve is that of a conventional engine having a heavy flywheel attached. Here the whole curve is lowered but still the vibration amplitude is substantial at high frequencies. The two lowest curves represent an engine incorporating the invention, that is, an engine having a dynamic torsional absorber tuned to a low frequency. The solid line is an undampened absorber while the dotted line indicates an absorber with say 6% of critical viscous dampening. It can be seen that the amplitude of vibration at $\omega_T$ is very low and $\omega_R$ the amplitude is still below that of a conventional flywheel engine.

To better understand the relative effect of the curves a specific example will be used. At low speeds the oscillating torque impressed on the crankshaft may vary from zero to twice the average torque and in an engine used in a present day passenger car, the amplitude of torque oscillation, $T_o$, has been measured at around 50 ft. lb. or 600 in. lb. The following values are of an actual construction.

$J_E$ of the crankshaft alone without flywheel _____ = .57 in. lb. sec.$^2$
$J_D$ of the damper mass _____ = .35 in. lb. sec.$^2$
K of the connecting shaft (FIG. 4) __ = 4,000 in. lb./rad.
P (percent of the critical dampening) = 6%
$T_o$ = 50 ft. lb. _____ = 600 in. lb.
$J_F$ of a crankshaft with conventional flywheel _____ = 3 in. lb. sec.$^2$ From these values the amplitude at any frequency can be determined and the results plotted as has been done in FIG. 8. In the example, the natural or tuned frequency $\omega_T$ = 107 radians/sec. The resonant frequency $\omega_R$ = 136 radians/sec. To convert these frequencies into engine RPM we multiply by 60 sec./min., divide by $2\pi$ rad./rev. and divide by 4 vibration oscillations per engine revolution. This gives a speed of the example engine of 255 r.p.m. at tuned frequency, and a speed at resonance of 325 r.p.m. This compares favorably with conventional engine and flywheel arrangements in present cars having idling speeds between 475 and 550 r.p.m.

It can be seen that by utilizing the invention it is possible not only to eliminate the conventional flywheel but it is possible to idle an engine at one-half conventional speeds or even less. This results in better fuel economy and quieter operation as well as a smaller car weight and increased engine acceleration. A lower idling speed also solves the problem of "creep" now caused by the high speed idle of present cars utilizing automatic transmissions employing torque converters or fluid couplings.

Figure 1:
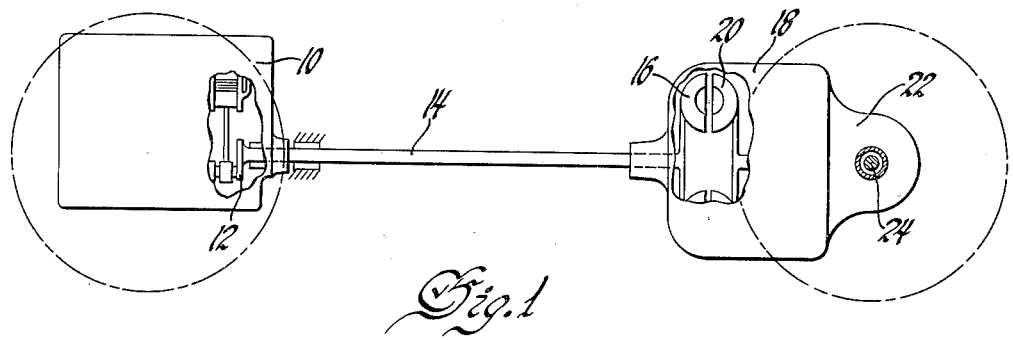
FIG. 1 is a side view of a motor vehicle power plant and drive train incorporating the invention.
Figure 2:
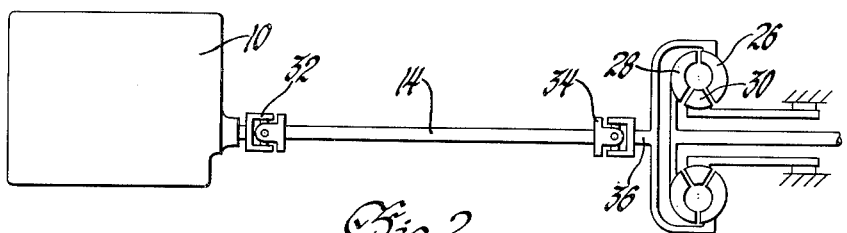
FIG. 2 is a view similar to FIG. 1 utilizing a torque converter instead of a fluid coupling.

Referring now to the illustrated embodiments shown in FIGS. 1 and 2, the engine 10 includes a crankshaft 12 connected to a propeller shaft 14 in turn connected to an impeller or pump 16 of a fluid coupling in a transmission 18. The turbine member 20 of the coupling is connected to drive other elements of the transmission, not shown, which in turn drives a differential 22 to turn the rear axles 24. The particular type of transmission employed is not important except in the specifications of the torque converter or fluid coupling. The inertia of the impeller 16, which corresponds to $J_D$ in the equivalent system of FIG. 5, must be related to the crankshaft inertia $J_E$ and spring constant K of the shaft 14 to provide the proper tuned and resonant frequencies $\omega_T$ and $\omega_R$ as well as provide a low vibration curve in FIGS. 7 and 8.

The particular characteristics of the fluid coupling or torque converter, such as is shown in FIG. 2, will also effect the coefficient of dampening and hence the percent of critical dampening. Factors which influence the viscous dampening are oil pressure in the coupling, viscosity of the oil, temperature, shape and size of the vanes, etc. These factors can be varied experimentally to determine their effect and then can be chosen to provide the minimum percent of critical dampening necessary to ensure that the amplitude of vibration at the resonant speed $\omega_R$ will be low enough for satisfactory operation.

In choosing the inertias of the crankshaft and impeller, as well as the stiffness of the propeller shaft, it is desirable to select values such that $\omega_T$ is fairly low, for example at the lowest speed the engine would be expected to idle. Also the ratio of $J_E$ to $J_D$ should be chosen so the resonant frequency $\omega_R$ is somewhere between the low idle frequency and the fast idle frequency used to warm the engine when cold. This high idle speed is usually about 1,000 r.p.m. or in an eight cylinder engine would be equivalent to frequency of oscillations of 420 radians per second. Therefore, the resonant frequency $\omega_R$ should be somewhere between the low idler speed, for example 250 r.p.m. or 105 rad./sec. and 1,000 r.p.m. or 420 radians/sec. Different applications might utilize a lower or higher idle speed than the example.

In general the smaller that $J_D$ is in relation to $J_E$ the greater will be the reduction of vibration in a system having a constant K and C. Furthermore to provide sufficient reduction in the vibration a small $J_D$ requires a small K. Therefore, the spring constant K of shaft 4 of the system shown in FIG. 4 must be fairly low.

In order to provide a propeller shaft with a sufficiently low spring coefficient K, such as 4,000 in. lb./rad., used in the example, it may be necessary in some installations, to utilize the type of drive shaft shown and described in the co-pending application S.N. 676,094 of John Z. DeLorean, filed August 5, 1957, entitled "Power Shaft." The type of shaft described in that application is particularly well suited for the present invention.

The torsion spring rate K of the shaft 14 is found from the $$\text{equation } K = \frac{GI_p}{l}$$

where:

G is the modulus of elasticity of the shaft material in shear, $I_p$ is the polar moment of inertia of the shaft,
$l$ is the length of the shaft.

In the case of a solid round shaft $$I_p = \frac{\pi d^4}{32}$$

where $d$ is the diameter of the shaft in inches. Therefore, $$K \text{ torsion} = \frac{G \pi d^4}{32 \times l}$$

If the shaft 14 is 82 inches long and the modulus of steel G used in the shaft $= 10.5 \times 10^6$ p.s.i.; in order that $$K = 4{,}000 \frac{\text{in. lb.}}{\text{rad.}}$$

then $$d^4 = \frac{32 K 1}{G \pi} = \frac{32 \times 4{,}000 \times 82}{10.5 \times 10^6 \times \pi} = .317$$

or $d = .75$ inch approximately which is rather small diameter shaft.

The example shown in FIG. 2 utilizes a torque converter having an impeller 26, a turbine 28 and a stator 30. This arrangement also shows a universal joint 32 between the engine 10 and propeller shaft 14 as well as a universal joint 34 between the shaft 14 and the transmission input shaft 36. The use of a universal joint does not affect the system as conventional univerasal joints are torsionally rigid.

Other forms of viscous dampening could be used instead of that resulting from the fluid coupling arrangement and some form of friction dampening could be utilized to reduce the amplitude of vibration at the resonant frequency $\omega_R$; however, I prefer to utilize the illustrated arrangement as each element comprising the vibration absorber, namely the propeller shaft 14 and the impeller 16 is necessary and performs other functions. Hence, no additional parts need be added to the drive train.

It is obvious from FIGURE 8 that where the present invention is tuned to the firing frequency of the engine at idle speed, the absorber will also reduce vibrations occurring at less than four times engine speed or frequency as for example, the ½, 1, 1½, 2, 2½, 3 and 3½ order harmonics described above.

It is recognized that torsional vibration absorbers have previously been used in connection with internal combustion engines; however, these applications have been with respect to high speed resonant vibrations wherein the crankshaft performs as a resonant system having several degrees of freedom, and, consequently, the absorbers which are separate devices that have been tuned to high speeds. It is believed novel to utilize a dynamic absorber in connection with low or idle speed forced vibrations where the crankshaft oscillates as a unit and is not a resonant system in itself but is made part of a resonant system by the addition of the dynamic absorber. This is considerably different than the use of an absorber in an originally resonant system to modify vibrations due to resonance rather than absorption of forced vibrations. It is furthermore believed novel to utilize the components of the drive train such as drive shaft and transmission components as a dynamic absorber for these vibrations.

Other applications as well as other arrangements and embodiments will be apparent to those skilled in the art and the invention is not to be limited by the specific embodiments shown and described but is to be limited only by the following claims.

What is claimed is:

1. A viscous dampened dynamic vibration absorber for reducing torsional vibrations of an internal combustion reciprocating engine at low rotational speeds in the region where the engine crankshaft is relatively rigid, the combination including a torsionally flexible power transmission shaft connected at one end to the engine crankshaft and a fluid torque transmitting device having an impeller member connected to the flexible shaft at its other end, said fluid torque transmitting device arranged to transmit engine power to a load, said impeller having a predetermined moment of inertia about its axis of rotation and said shaft having a predetermined torsional spring rate such that the natural frequency of the shaft and impeller as a system is less than the frequency of firing stroke impulses imposed on the engine shaft at said low speeds, said fluid torque transmitting device acting as a viscous dampener for reducing torsional vibrations when the system comprising the engine, shaft and impeller is rotating at its natural frequency.

2. In a motor vehicle, an engine having a normal operating speed range between a minimum fuel idle speed and a maximum fuel maximum speed, said engine having $n$ firing strokes per engine revolution, said engine having a crankshaft, a tuned vibration absorber for absorbing forced vibrations imposed on said crankshaft at or near said idle speed, said absorber comprising a flexible power transmitting shaft means connected at one end to said engine shaft and having a torsional spring constant K measured in in. lb. per radian and a mass element attached to said flexible means having a moment of inertia I in-lb.-sec.², said mass comprising the input inertia mass of a power transmitting device arranged to transmit engine power to a load, said absorber having a natural frequency speed $$\omega_n \text{ in radians per second} = \sqrt{\frac{K}{I}}$$

said stiffness K and said element moment of inertia I being chosen so that $\omega_n$ is equal to or less than $n$ times said idle speed measured in radians per second.

3. A power system including an engine having a crankshaft with a moment of inertia $J_1$ in. lb. sec.² and a tuned vibration absorber for the crankshaft including a power transmitting shaft having a torsional stiffness K in. lb./rad. connected at one end to the crankshaft and at the other end to a mass having a moment of inertia $J_2$ in-lb.-sec.² wherein the natural frequency speed of the absorber found from $$\omega_n = \sqrt{\frac{K}{J_2}}$$

is less than $n$ times the normal minimum operating frequency of the engine in radians per second, where $n$ is the number of firing strokes per engine revolution, and wherein the resonant frequency speed $\omega_r$ of the system found from $$\omega_n = \sqrt{\frac{K(J_1 + J_2)}{J_1 J_2}}$$

is also less than $n$ times the normal minimum operating frequency of the engine, said mass comprising the input inertia mass of a power transmitting device arranged to transmit engine power to a load.

4. In a motor vehicle, an engine having a rotary moment of inertia $J_E$, a drive shaft connected at one end to said engine, a transmission connected to drive the vehicle including a fluid torque transmitting device having an impeller connected to the other end of said drive shaft, said impeller having a rotary moment of inertia $J_D$, said drive shaft and impeller constituting a tuned dynamic vibration absorber having a natural frequency speed determined by $$\omega_n = \frac{1}{2\pi} \sqrt{\frac{K}{J_D}}$$

said engine having a normal operating speed above a minimum speed in radians per second, said absorber natural frequency speed $\omega_n$ establishing the minimum engine operating speed.

5. In a power unit having an engine having a crankshaft, a drive shaft connected to the crankshaft and a viscous dampened mass connected to the drive shaft, said drive shaft having a torsional stiffness K in. lb./radian, said mass having a moment of inertia about its axis of rotation I, said shaft and said mass constituting a tuned dynamic vibration absorber having a natural frequency speed $$\omega_n \text{ equal to } \sqrt{\frac{K}{I}}$$

in radians per second, said engine having a speed of operation ranging between a minimum idle speed and some maximum speed, said natural frequency speed $\omega_n$ being equal to or less than the number of firing strokes of said engine per engine revolution times the engine idle speed measured in radians per second.

References Cited in the file of this patent

UNITED STATES PATENTS

| | | |
|---|---|---|
| 1,107,731 | Vold | Aug. 18, 1914 |
| 1,965,742 | Junkers | July 10, 1934 |
| 2,328,141 | Haltenberger | Aug. 31, 1943 |
| 2,333,122 | Prescott | Nov. 2, 1943 |
| 2,724,983 | O'Connor | Nov. 29, 1955 |

FOREIGN PATENTS

| | | |
|---|---|---|
| 472,672 | France | Aug. 13, 1914 |
| 513,914 | Great Britain | Oct. 25, 1939 |
| 572,754 | Germany | Mar. 22, 1933 |

OTHER REFERENCES

Vibration Problems in Engineering, 3rd ed., 1955 by Timoshenko and Young, published by Van Nostrand Co. (Copy in Div. 12.) (Pages 9–13.)

Zeitschrift des Vereines Deutscher Ingenieure pp. 797–803, Band 46, January-June 1902, Julius Springer, Berlin, 1902 by H. Frahm. (Copy in Scientific Library.)